June 24, 1952 E. K. JOHANSEN Re. 23,513
CRANKSHAFT BEARING ASSEMBLY
Original Filed June 4, 1948 2 SHEETS—SHEET 1
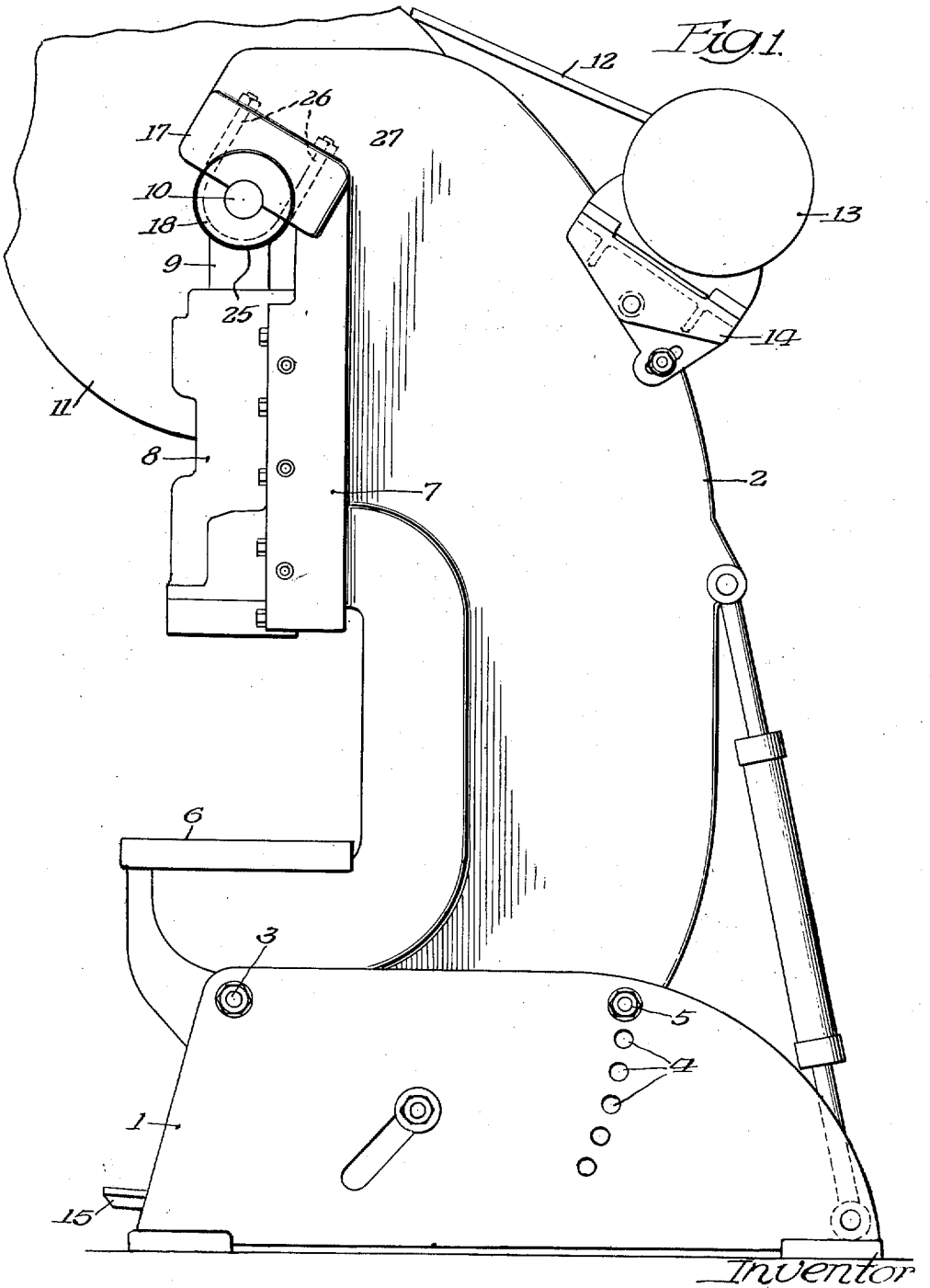
Inventor
Einar K. Johansen
By: Spencer, Marzall, Johnston & Cook Attys.

CRANKSHAFT BEARING ASSEMBLY
Original Filed June 4, 1948 2 SHEETS—SHEET 2
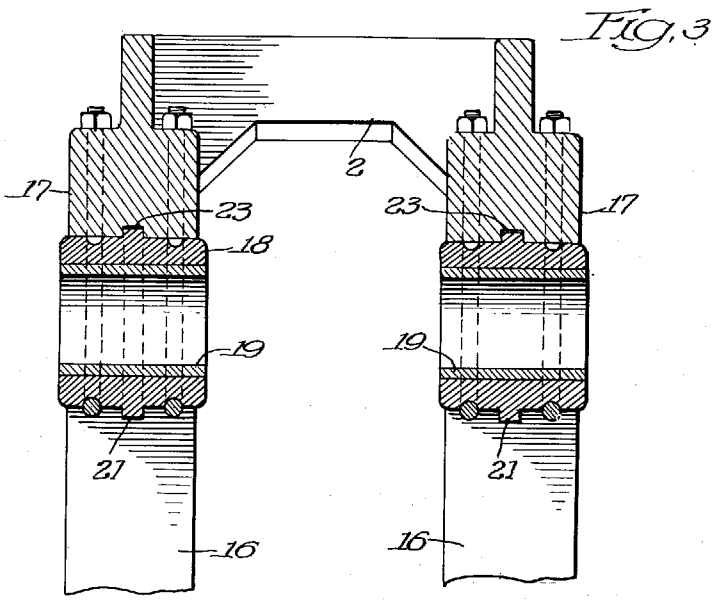
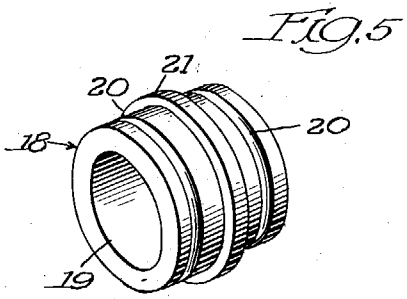
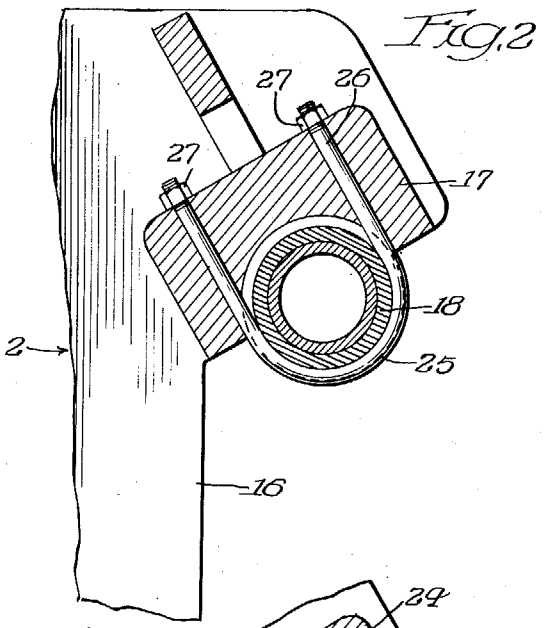
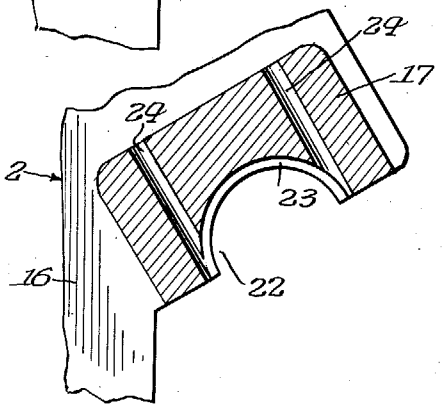
Inventor
Einar K. Johansen
By: Spencer, Marzall, Johnston & Cook
Attys Reissued June 24, 1952

Re. 23,513

UNITED STATES PATENT OFFICE 23,513

CRANKSHAFT BEARING ASSEMBLY

Einar K. Johansen, Oak Park, Ill., assignor to Clearing Machine Corporation, Chicago, Ill., a corporation of Illinois Original No. 2,573,574, dated October 30, 1951, Serial No. 31,123, June 4, 1948. Application for reissue February 2, 1952, Serial No. 269,630.

2 Claims. (Cl. 308—23)

Matter enclosed in heavy brackets [ ] appears in the original patent but forms no part of this reissue specification; matter printed in italics indicates the additions made by reissue.

This invention relates in general to improvements in metal working presses of the C-frame type, and is particularly directed to a new and improved form of crankshaft bearing assembly for such presses. The invention, however, has general application, and it is shown herein as applied to a gap-frame press, primarily for purposes of illustration.

Gap-frame presses, and particularly those of the inclinable type, have been manufactured for a number of years, and are made in a number of different sizes so that the pressures obtainable during operation of the press range upwardly to several tons. One of the major obstacles in the manufacture of these presses has been the machining operations which must necessarily be performed thereon in the vicinity of the crankshaft bearing assembly. In present constructions, it is necessary to perform machining operations on the frame of the press, and the size of these frames renders such machining operations difficult and expensive. The present invention is directed primarily to avoiding some of these machining operations on the frame of the press itself, thus reducing the cost of manufacture.

An important object of the present invention is therefore to provide a new and improved crankshaft bearing assembly for use in metal working presses which will overcome the disadvantages set forth hereinabove, and which will lessen the manufacturing cost of such presses.

Another object of the invention is to provide a crankshaft bearing assembly for gap-frame presses which will eliminate the necessity for any machining operations on the frame of the press itself.

A further object of the invention is to provide a crankshaft bearing assembly for gap-frame presses wherein a bearing member is formed and machined separately, and thereafter applied to the head of the press frame, and wherein the bearings may be assembled with the crankshaft prior to mounting on the frame of the press.

Still another object of the invention is to provide a crankshaft bearing assembly for a gap-frame press wherein individual bearing members are first formed and machined, then assembled with the crankshaft and inserted in place in the head of the press frame. Novel means are also provided for securing and mounting these individual bearing members in the press frame and for preventing displacement thereof during operation of the press.

A still further object of the invention is to provide a novel form of individual bearing member for use in the crankshaft bearing assembly of gap-frame presses.

Other objects and advantages of the invention will become apparent upon reading the following description taken in conjunction with the accompanying drawings, in which:

Fig. 1 is a side elevational view of an inclinable C-frame or gap-frame press, showing an example of the type of press to which the present invention may be applied.

Fig. 2 is a fragmentary view of the head or upper part of the frame, showing a portion of the crankshaft bearing assembly in vertical section.

Fig. 3 is a fragmentary view of the upper portion of the press frame partly in elevation, and partly in section, showing the individual bearings in place.

Fig. 4 is a view similar to Fig. 2, with the bearing member and fastening means removed therefrom, and Fig. 5 is a perspective view of a preferred form of individual bearing member.

As stated hereinabove, the invention herein is not restricted to use with a gap-frame press, but such a press has been illustrated herein as one of the preferred types of metal working press to which the invention is particularly applicable. Gap-frame presses of the inclinable type, and the operation of such presses, are generally well known to those skilled in the art, and it is only necessary here to describe briefly the various parts of the press and its manner of operation, in order that the present invention and its application to the press may be more easily understood and appreciated.

Referring especially to Fig. 1 of the drawings, the base of the press is indicated by the numeral 1, and the frame of the press is indicated at 2. The base 1 has spaced upstanding sides thereon between which the frame 2 is located, and to which this frame is pivotally connected as at 3. The frame of the press is capable of being inclined, and pivoted, about the pivotal point 3, and may be maintained in any one of a plurality of inclined positions by reason of the openings 4, which are adapted to receive a bolt 5 therein. The inner end of the bolt 5 is adapted to be secured to a portion of the frame, and thereby may hold the press in any inclined position.

The press frame 2 is provided with a bed 6 on which a lower die member may be placed for cooperation with an upper die member for the shaping and working of metal located on the lower die member. The upper part of the frame 2 at the forward side thereof is provided with guideways 7, adapted to guide the slide member 8 in its vertical reciprocation. The slide member 8 is adapted to carry the upper die member which cooperates with the lower die member positoned on the bed 6. These upper and lower die members are not shown herein.

The slide 8 may be reciprocated vertically in the guideways 7 by means of a connecting link 9, the lower end of which is connected to the slide 8 and the upper end of which is connected to the crank portion of a crankshaft 10. One end of the crankshaft 10 has a flywheel 11 mounted thereon, which is driven through the medium of belts 12 passing around a pulley (not shown) on the shaft of a motor 13, which in turn is mounted on a suitable bracket 14 at the rear of the frame 2. An operating pedal 15 is suitably positioned in the base 1 for operation by the operator of the machine. When the pedal 15 is depressed, suitable and well known clutch mechanism is actuated to thereupon rotate the crankshaft 10 and cause a reciprocating movement of the slide 8.

The foregoing in general describes the operation of a conventional gap-frame press. It will be evident that there may be many details of such a press which may be specifically different from those shown herein, depending upon the manufacture of such presses, but in general, these presses are made and are operated in accordance with the foregoing brief description.

The upper part of the frame 2 is provided with spaced side members 16, wherein the space therebetween permits operation of the crankshaft and permits movement of the bearing at the upper end of the link 9, which clamps around the crankshaft 10. The upper ends of these side members 16 terminate in what may be called heads 17. In accordance with present practice, these heads 17 have semi-circular recesses therein, forming one-half of the bearing assembly for the crankshaft. The inner and outer surfaces of these bearings must form a smooth surface, and must therefore be machined. It is this machining operation of the inner and outer surfaces of the heads 17 which this invention has been able to overcome. The fact that this machining operation must be done on the huge frame of the press itself is some indication as to the cost involved. If this machining can be dispensed with, then the cost of manufacture of the press can be materially lessened.

The present invention is therefore primarily directed to the provision of individual bearing members which may be machined prior to assembly, and then assembled onto the crankshaft before mounting in the heads 17. It will be quite evident that the machining operation necessary for these individual bearing members will be considerably less expensive than the cost of machining the heads 17. It will likewise be evident that the task of assembling the crankshaft and mounting it on the frame will also be considerably facilitated.

The preferred form of bearing member is shown in Fig. 5, and is indicated generally by the numeral 18. This bearing member is circular in form, and has an inner bearing surface 19, adapted to receive the ends of the crankshaft. Annular grooves 20 are located in the outer surface of each bearing member 18, and are preferably positioned one adjacent each end of the bearing. An annular rib 21 is located around the outer surface of each bearing 18, and is preferably positioned between the annular grooves 20 for a purpose which will presently become evident.

Each head 17 had a substantially semi-circular recess 22 therein, in substantially the center of which there is a groove 23 which has a cross section complementary to the cross section of the rib 21 on the bearing member. Each head 17 also has a pair of openings 24 extending through from the top to the bottom thereof on opposite sides of the groove 23.

When a bearing 18 is to be placed in position, the annular rib 21 thereon will be inserted in the complementary groove 23 within the head 17, whereby to prevent endwise movement of the bearing. The bearing is then held in place by means of a pair of U-bolts 25 having legs 26 adapted to extend through the openings 24. The curved portion intermediate the legs 26 of each bolt 25 will be received within the annular grooves 20 on the bearing. The U-bolts 25 may be held in place by any suitable means such as the nuts 27 threaded on the ends thereof.

With this invention there is little or no machinery which needs to be done on the heads 17 which support the crankshaft on the frame. The bearing members 18 may be made in quantities and machined very easily. In assembling, it is merely necessary to place one of the bearing members 18 on each end of the crankshaft 10, and then place the entire crankshaft and bearings in the recesses 22, whereupon the U-bolts 25 may be inserted in place and fastened, and thus the mounting of the crankshaft is completed.

The annular rib 21 and the complementary groove 23 may be broadly defined as interfitting means to prevent endwise movement of the bearings. It is preferable that this interfitting engagement be considered in this light, because of the obviousness that the rib could be formed on each of the heads 17 and the groove into which the rib fits could be on the bearing member itself with the same result. It is likewise true that the external configuration of the bearing member could assume a form other than circular if so desired, and without in any way departing from the spirit of the invention, although the circular formation of the bearing member is perhaps the most economical to manufacture.

Changes may be made in the form, construction and arrangement of parts from that disclosed herein without in any way departing from the spirit of the invention or sacrificing any of the attendant advantages thereof, provided, however, that such changes fall within the scope of the claims appended hereto.

The invention is hereby claimed as follows:

1. In a metal working press having a vertically reciprocating silde member driven by a crankshaft, a bearing assembly comprising a pair of spaced side members, a head on each of said side members, said head members being positioned to receive a crankshaft therebetween, each of said heads having a semi-circular recess therein and a groove located in said recess, said groove extending substantially parallel to the sides of said head and located substantially midway therebetween, an individual bearing member in each of said recesses adapted to receive the ends of said crankshaft therein, an annular continuous rib centrally disposed circumferentially around each of said bearings and fitted into said groove, each of said bearings having an annular groove therearound and located adjacent each end of said bearing and spaced substantially equidistant from said rib and a pair of U-bolts each fitted into one of said grooves at the base of said U and anchored to said head at the free ends thereof.

2. *In a metal working press having a vertically reciprocating slide member driven by a crankshaft, a bearing assembly comprising a pair of spaced side members, a head on each of said side members, said head members being positioned to receive a crankshaft therebetween, each of said heads having a semi-circular recess therein, an individual bearing member in each of said recesses adapted to receive the ends of said crankshaft therein, interengaging means in each of said recesses and on each of said bearings, said interengaging means preventing axial shifting of said bearings in the respective recesses, each of said bearings having an annular groove*

*therearound and located adjacent each end of said bearing and spaced from said interengaging means, and a pair of U-bolts each fitted into one of said grooves at the base of said U and anchored to said head at the free ends thereof.*

EINAR K. JOHANSEN.

REFERENCES CITED

The following references are of record in the file of this patent or the original patent:

UNITED STATES PATENTS

| Number | Name | Date |
|---|---|---|
| 449,046 | Loveli | Mar. 24, 1891 |
| 729,356 | King | May 26, 1903 |
| 1,632,462 | Candee | June 14, 1927 |
| 1,652,468 | Catlin | Dec. 13, 1927 |
| 1,868,817 | Dunham | July 26, 1932 |
| 1,960,166 | Rode | May 22, 1934 |
| 2,272,118 | Imse | Feb. 3, 1942 |